F. E. MOREHOUSE AND C. O. MANNING.
AUTOMATIC MOTION PICTURE ADVERTISING SIGN.
APPLICATION FILED JUNE 22, 1920.

1,367,558.

Patented Feb. 8, 1921.
4 SHEETS—SHEET 1.

Inventors
F. E. Morehouse.
C. O. Manning.

By Lancaster and Alwine
their Attorneys

F. E. MOREHOUSE AND C. O. MANNING.
AUTOMATIC MOTION PICTURE ADVERTISING SIGN.
APPLICATION FILED JUNE 22, 1920.
1,367,558.
Patented Feb. 8, 1921.
4 SHEETS—SHEET 2.
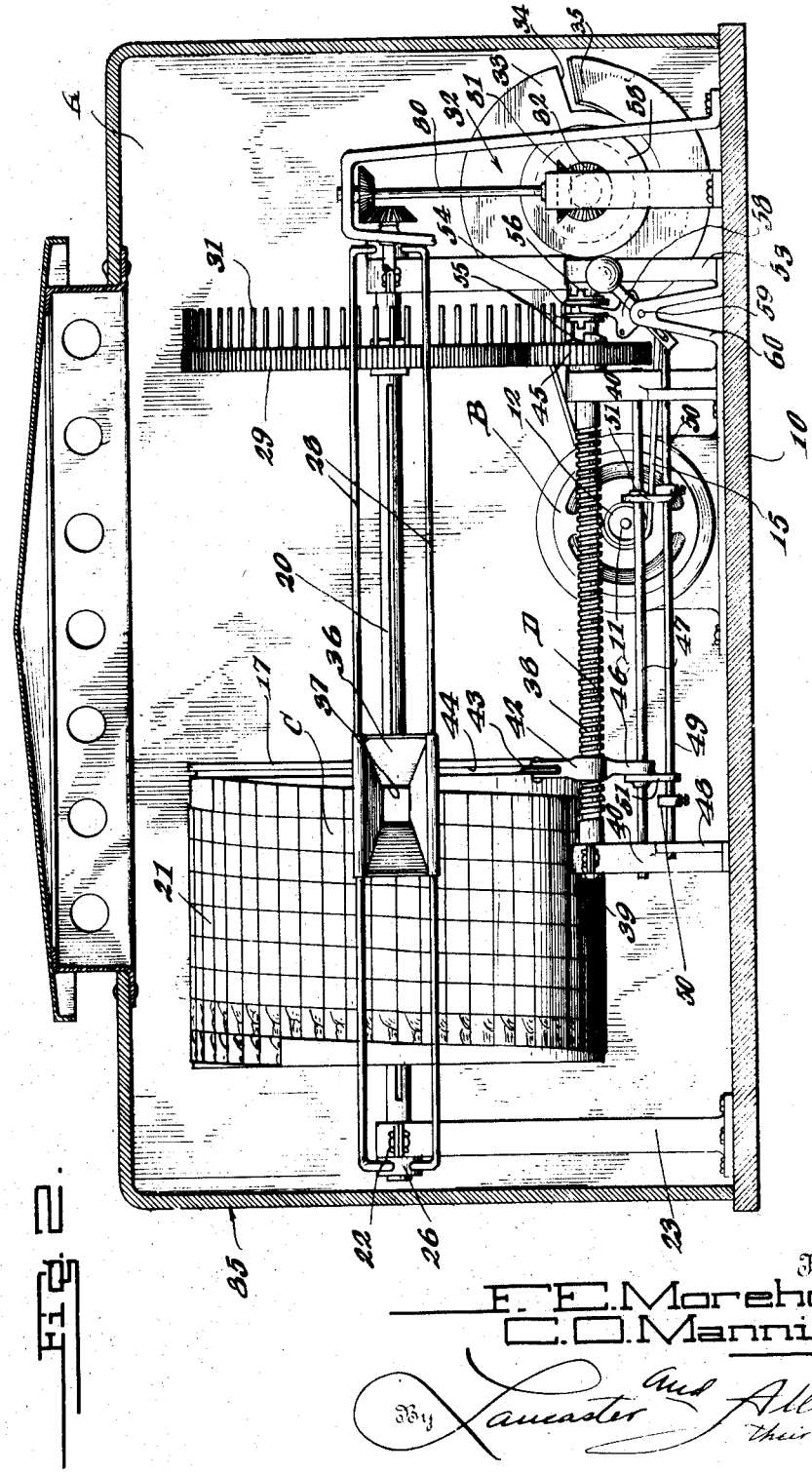

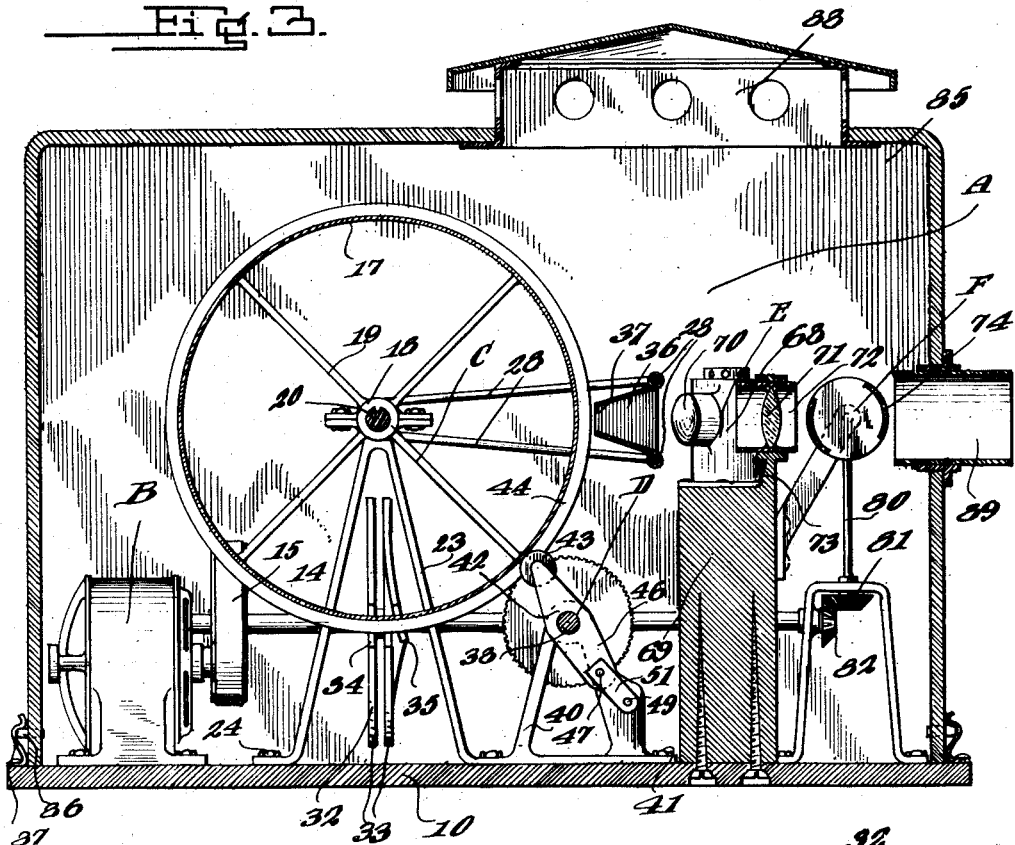

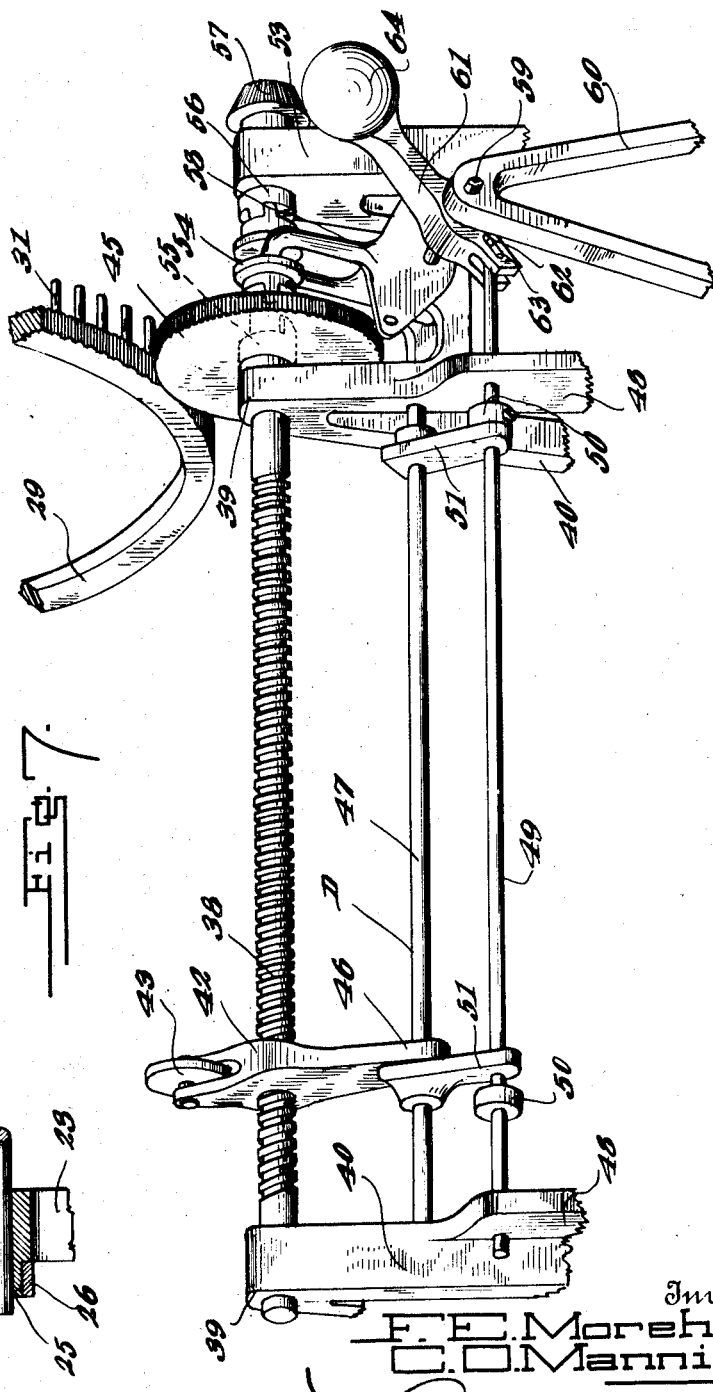

UNITED STATES PATENT OFFICE.

FRANK E. MOREHOUSE AND CARL O. MANNING, OF MEMPHIS, TENNESSEE.

AUTOMATIC MOTION-PICTURE ADVERTISING-SIGN.

1,367,558.  Specification of Letters Patent.  Patented Feb. 8, 1921.

Application filed June 22, 1920. Serial No. 390,872.

*To all whom it may concern:*

Be it known that we, FRANK E. MOREHOUSE and CARL O. MANNING, citizens of the United States, residing at Memphis, in the county of Shelby and State of Tennessee, have invented certain new and useful Improvements in Automatic Motion-Picture Advertising-Signs, of which the following is a specification.

This invention relates to picture projecting machines, and the primary object of the invention is to provide an improved motion picture machine which is particularly adaptable for advertising purposes and which is designed to supplement the costly and intricate electric signs now in vogue.

Another object of the invention is to provide an improved motion picture machine which will be entirely automatic in operation and which will not require the services of an operator for actuating the same.

A further object of the invention is to provide an improved motion picture machine in which the pictures are thrown on the screen by reflected light, the screen forming the advertising sign, the method of throwing the pictures on the screen by reflected light permitting of photographs, colored pictures and the like to be utilized in lieu of the usual highly inflammable and breakable moving picture film now in use.

A further object of the invention is to provide an improved motion picture machine embodying a cylindrical drum carrying the spirally arranged pictures which are to be projected, a stationary light receiving cone which carries the sight opening behind which the pictures are adapted to successively appear, means for directing rays of light in said cone and on said pictures, a projecting lens, and means for automatically operating the cylinder for successively bringing the pictures in rear of said sight opening.

A further object of the invention is to provide an improved means for intermittently feeding the drum so that the pictures will be successively and slowly fed in rear of the sight opening, and in relation to each other so that a motion picture may be projected on to the screen and an improved means for automatically returning the drum to its original starting position, when all of the pictures have been projected, the said means being so arranged as to return the drum back to its normal position at a relatively high rate of speed whereby the pictures will be prevented from being thrown on the screen.

A still further object of the invention is to provide an improved means operated by the drum actuating means itself for reversing the direction of the feed screw for the drum when the drum reaches the extreme limits of its movement whereby the drum will be automatically returned at all times to its original starting position and be again actuated for permitting the pictures thereon to be projected on a screen automatically.

With these and other objects in view, the invention consists in the novel construction, arrangement and formation of parts as will be hereinafter more specifically described, claimed and illustrated in the accompanying drawings, forming a part of this specification, in which drawings:

Fig. 2 is a vertical section through the improved apparatus showing the cover plate or housing in position and illustrating the means for operating the picture carrying drum.

Fig. 3 is a vertical section through the improved apparatus taken at right angles to Fig. 2.

Fig. 4 is an enlarged detail vertical section through one of the light projectors utilized for concentrating the light upon the picture to be reflected.

Fig. 5 is a detail perspective view of the cam disk utilized for giving a certain step by step motion to the picture carrying drum.

Fig. 6 is a detail vertical section through one of the bearings for supporting the drum carrying shaft and illustrating the means of connecting the guide arms thereto, and Fig. 7 is an enlarged fragmentary perspective view of the automatic operating and reversing means for the picture carrying drum.

Figure 1:
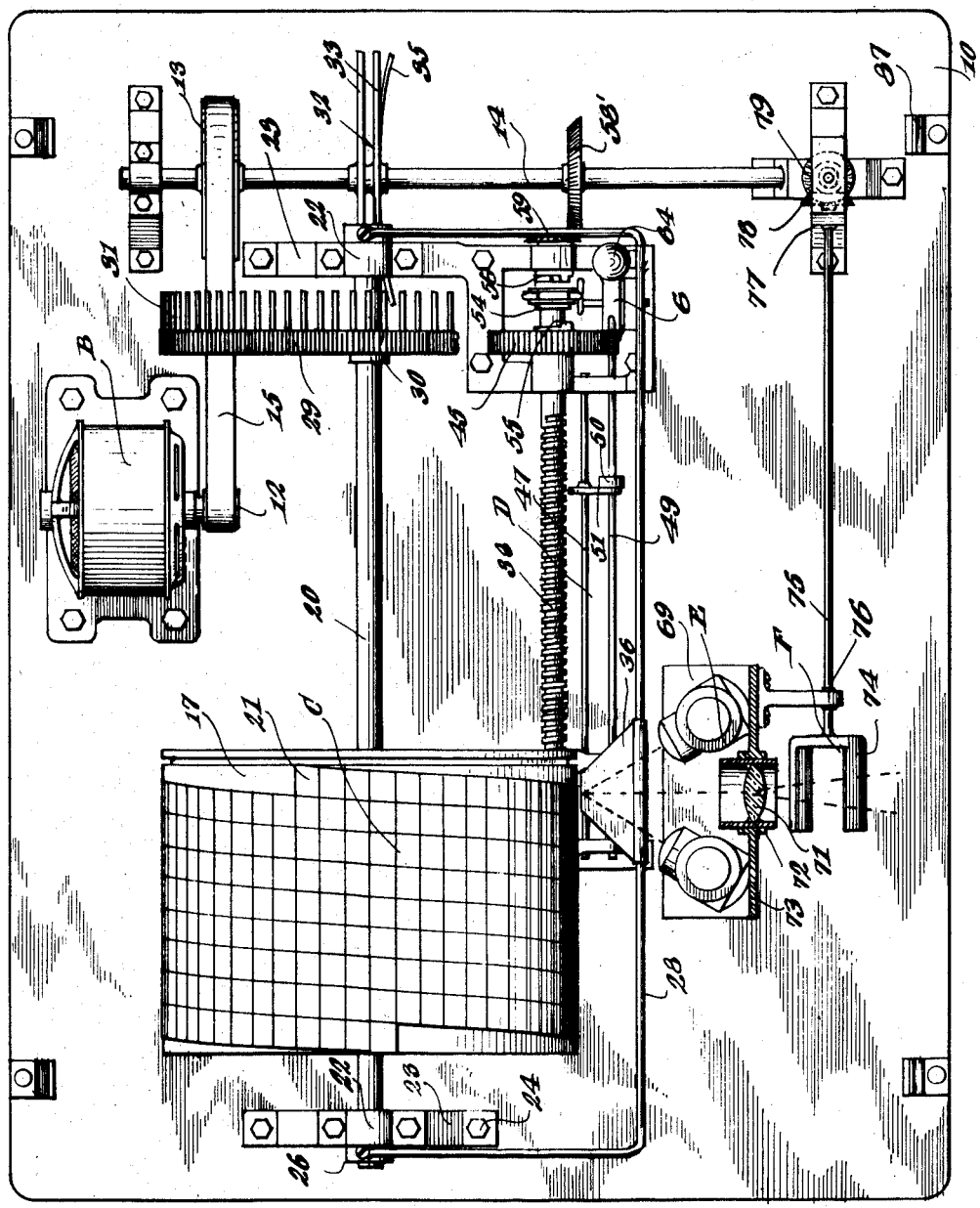
Figure 1 is a plan view of the improved motion picture sign apparatus showing the protecting housing removed, parts of the apparatus being shown in section.

Referring to the drawings in detail, wherein similar reference characters designate corresponding parts throughout the several views, the letter A generally indicates the improved motion picture sign apparatus which includes the substantially rectangular flat base plate 10. The base plate 10 carries the various parts of the improved apparatus, which as shown consists of the prime mover B, the picture carrying drum and supporting mechanism C, the reversing mechanism D, the light projecting mechanism E, and the shutter F.

The prime mover B may be of any preferred type and as shown is an electric motor which has the armature shaft 11 thereof provided with a suitable drive pulley 12 which is in direct alinement with a relatively large pulley 13, which is keyed or otherwise secured to the drive shaft 14. The pulleys 12 and 13 have trained around the same a drive pulley belt 15. The drive shaft 14 provides means for driving the picture drum C which will be now described.

The picture drum C includes a cylindrical rim 17, the hub 18 and the connecting spokes 19. The hub 18 is feathered on a shaft 20, so that the drum can rotate therewith and move longitudinally of the same. The rim 17 is formed relatively wide so that a relatively large area will be provided for the picture strip 21. The picture strip 21 as shown is wound spirally upon the outer surface of the drum and these pictures may be printed in the ordinary manner from a moving picture negative. The shaft 20 has its terminals mounted in suitable bearings 22, carried by the bearing brackets 23 which are bolted or otherwise secured as at 24 to the upper surface of the base plate 10. The outer faces of the bearings 22 are provided with reduced extensions 25 which receive the stationary collars 26. The collars 26 are held against movement by means of a set screw or the like 27. The collars 26 form means for supporting a pair of spaced substantially U-shaped guide rods 28, the bight portions of which extend in front of and in spaced relation to the drum. The purpose of these guide rods will be hereinafter more fully set forth. The drum C is adapted to be operated in a step by step movement similar to the feed of a moving picture film by the provision of a relatively large annular ring gear 29. This ring gear 29 is keyed or otherwise secured as at 30 to the shaft 20 and the outer face of this ring gear is provided with a plurality of equi-distantly spaced pins 31. The pins are spaced a distance apart corresponding to the length of each picture of the strip 21. The shaft 14 which forms the operating means for the drum C carries an operating wheel 32, which is constructed of a pair of disk shaped plates 33 secured together for synchronous movement. The disks 33 are secured to a common hub which is keyed or otherwise secured to the shaft 14. Each of the disks 33 are provided at diametrically spaced points with inwardly extending notches 34, which form means for permitting the entrance and exit of the pins 31 between the disks 33. The outer disk 33 has one of the side walls of each of the slots or notches 34 struck outwardly to provide diametrically opposed cam members 35 which are adapted to engage the pins as the disks are rotated.

In operation of this part of the device it can be seen that when one of the cam members 35 engage one of the pins the same will slide on the inner surface of the cam member and thus move the ring gear 29 a space corresponding to a picture and during the continued rotation of the disks the ring gear and the picture will be held stationary. As soon as the other cam member comes into engagement with another pin, the ring gear 29 will be again rotated a picture length and thus bring a new picture into picture projecting position.

A pyramidal shaped member 36 is secured to the rods 28 and has its tapering end disposed innermost and toward the rim 17 of the picture carrying drum C. The inner end or tapered part of the pyramidal shaped member 36 is provided with a sight opening 37 and the pictures are adapted to be brought into alinement with this sight opening by means of the operating wheel 32 and the ring gear 29.

The means D is provided for sliding the drum C across the apparatus so as to successively bring the pictures of the strip in alinement with the sight opening during the rotation of the drum and this means includes a feed screw 38 which is mounted in spaced parallel relation to the shaft 20. The terminals of the feed screw 38 are rotatably mounted in suitable bearings 39 carried by the upper ends of bearing brackets 40 which are bolted or otherwise secured as at 41 to the upper surface of the base plate 10 in advance of the brackets 23. The feed screw 38 has mounted thereon a nut or follower 42, the upper end of which rotatably carries a feed wheel 43 which engages in an annular groove 44 formed in the outer surface of the rim 17 of the picture carrying drum C. One end of the feed screw 38 has mounted thereon a relatively small gear wheel 45 which meshes with the relatively large ring gear 29 keyed to the shaft 20. Thus it can be seen that when the screw 38 is rotated by means of the gear 45 meshing with the ring gear 29, that the drum will be soon fed in correct relation to its rotary movement along the shaft 20. The lower surface of the feed nut 42 has also formed thereon a depending lug 46 which is slidably mounted upon an upper guide rod 47. The guide rod 47 has its terminals mounted in the bearing bracket 40 in any preferred manner, and the outer face of these bearing brackets carry outwardly extending flanges 48 which form supports for a lower guide rod 49. The lower guide rod 49 has secured thereto by means of set screws or the like collars 50 which form stops, the purpose of which also will be hereinafter more fully described. These collars are adjustable on the lower guide rod 49 so as to permit the same to be adjusted toward or away from each other. The upper guide rod 47 has rigidly secured thereto depending feet 51 which also engage the lower guide rod 49. It can be seen that when the nut 42 is at one limit of its movement the lug 46 will engage one of the feet 51 and slide the rod 47 in its bearings and engage one of the collars 50 which will shift the rod 49. When the nut 42 reaches the limit of its other movement, the same will engage the other foot 51 which will slide the rod 47 and force the foot 51 into engagement with the other collar 50 and shift the lower rod 49 in its bearing in an opposite direction. The feed screw 38 is extended beyond one of the brackets 40 and this extended terminal of the feed screw is supported by the upper end of a supporting bracket 53 and the portion of the feed screw intermediate the bracket 53 and the bracket 40 has splined or feathered thereto a shifting clutch section 54 which is adapted to engage either the rigid clutch face 55 formed on the small gear wheel 45 or with the rigid clutch face 56 formed on the hub of the beveled gear wheel 57 which meshes with the relatively large gear wheel 58' which is keyed or otherwise secured to the shaft 14. The relatively small beveled gear wheel 57 is mounted for free rotation on the feed screw 38. Thus it can be seen that when the clutch section 54 engages the rigid clutch face 55 carried by the small gear wheel 45 the feed screw 38 will be operated by means of the ring gear 29 and when the clutch section 54 is in engagement with the clutch face 56 carried by the relatively small beveled gear wheel 57 the feed screw 38 will be operated direct from the shaft 14. The provision of the gear 45 and the beveled gear wheel 57 forms means for reversing the direction of the feed screw 38 so that the drum C will successively slide across and back the apparatus. The shifting clutch section 54 is operatively engaged by a yoke 58 which is carried by a rocking shaft 59. The terminals of this rocking shaft 59 are mounted in suitable bearings carried by brackets 60 which are secured to the upper face of the base plate 10. The rocking shaft 59 has also secured thereto an arm 61, which extends above and below the shaft. The lower end of the arm 61 is slotted for the reception of one end of the lower guide rod 49 and this end of the guide rod 49 carries outwardly extending pins 62 which engage in suitable slots 63 formed in the lower end of the arm 61. The upper end of the arm 61 is provided with a weight 64, which forms means for holding the rocking shaft 59 in an adjusted position. Thus it can be seen that when the drum reaches a limit of its movement one of the collars 50 will be actuated for shifting the rod 49 which will shift the position of the movable clutch section 54 for reversing the direction of the feed screw 38. It can be therefore seen that an automatic means has been provided for effectively feeding the drum C back and forth on the shaft 20.

When the gear 45 is engaged by the clutch section 54 and the feed screw 38 is turned by the ring gear 29, the rotation of the feed screw 38 will be comparatively slow and therefore the sliding of the drum on the shaft 20 will be comparatively slow and therefore give sufficient time for the correct projection of the pictures. However, when the sliding clutch section 54 engages the rigid clutch section 56 of the beveled gear wheel 57 the feed screw 38 will be driven at a relatively high rate of speed owing to the connection of the beveled gear 57 with the beveled gear 58', which will permit of the returning of the drum to its initial position at a relatively high rate of speed. This will prevent the exhibiting of the picture.

The light concentrating means E includes a pair of spaced high powered lamps 67 which are arranged in casings 68. These casings 68 are secured to the upper surface of a block 69 which forms means for supporting the light casings in correct positions. The block 69 is secured to the upper surface of the base plate 10 in any suitable manner directly in front of the pyramidal shaped member 36. The inner end of the light casings 68 carries light concentrating lenses 70 which are so directed that the light rays will be trained into the pyramidal shaped casing or member 36, which will reflect the picture through the projecting lens 71 which is carried by a housing 72 secured to the upstanding flange 73 carried by the block 69.

To permit of the correct projection of the reflection of the pictures on the screen without slipping, a barrel shutter 74 is provided which constitutes the means F heretofore referred to. The barrel shutter 74 is carried by a rotatable shaft 75 which is synchronously operated in relation to the drum C so that the same will be correctly operated in relation to the pictures thereof. The shaft 75 as shown is mounted in suitable bearings 76 and 77 and the inner end of the shaft carries a beveled gear wheel 78 which meshes with a beveled gear wheel 79 carried by a vertically disposed shaft 80. This vertically disposed shaft 80 is mounted in suitable brackets and carries a beveled gear wheel 81 which meshes with a beveled gear wheel 82, which is keyed or otherwise secured to the shaft 14.

The parts of the apparatus are adapted to be completely housed by a casing 85 which is detachably secured to the upper surface of the base plate 10. This housing 85 carries lugs 86 which are adapted to be detachably engaged by spring clips 87 carried by the base plate 10. The provision of the spring clips 87 and the lugs 86 prevent accidental displacement of the housing. The upper end of the housing carries a suitable ventilator 88 as clearly shown in the drawings. The front wall of the casing 85 is provided with a projecting tube 89, through which the rays of light from the lens 71 are adapted to be projected.

It is to be understood that the apparatus is to be positioned in any preferred arrangement to the screen which is to be in the nature of a bill board or the like so that the advertisement shown thereon will readily catch the eyes of passersby.

In operation of the improved apparatus, the picture strip 21 is wound spirally upon the rim 17 of the drum C and the drum is positioned on the shaft 20 so that the first picture on the strip will be in direct alinement with the sight opening 37. The apparatus is then set in motion and the feed screw 38 will slide the drum C along the shaft 20 during the rotation of the shaft 20 by the provision of the pins 31 of the disk operating wheel 32. When the drum has reached the limit of its movement and all of the pictures have been thrown on the screen one of the collars 50 will be operated for shifting the rod 49 which will shift the position of the clutch 54 which will reverse the direction of the feed screw 38 and return the drum C at a relatively high rate of speed to its initial position. When the drum C reaches its original position the other collar 50 will be tripped which will slide the rod 49 in an opposite direction and return the clutch to its original position in engagement with the clutch section 55 carried by the small gear wheel 45.

From the foregoing description it can be seen that an improved motion picture apparatus has been provided, which is entirely automatic in its operation and will effectively permit of the same being used for advertising purposes.

Changes in details may be made without departing from the spirit or scope of this invention; but,

We claim:

1. In a moving picture apparatus, a casing having a picture display opening therein, a shaft mounted in said casing, a drum slidably mounted on said shaft and secured thereto for rotation therewith, means for rotating said shaft step by step to bring the pictures to be reflected into picture reflecting position, means for sliding the drum across said shaft until all of the pictures have been exhibited and means for automatically reversing the direction of the drum whereby the same will be returned to its initial position on said shaft, and means for rotating the drum at a relatively high rate of speed when the direction thereof is reversed.

2. In a picture projecting apparatus, a casing having a picture projecting opening therein, a rotatable shaft arranged in said casing, a light concentrating screen arranged in front of said shaft having a sight opening therein, a drum slidably mounted on said shaft and arranged for rotation therewith, pictures arranged on the outer surface of said drum, the pictures being adapted to be brought into alinement with the light concentrating member, means for intermittently rotating the shaft to successively bring the pictures into picture projecting position in relation to the light concentrating member, means operated by said shaft operated means for sliding the drum on said shaft until all of the pictures have been projected, and means operated by said drum for automatically returning the same to its initial position on said shaft after all of the pictures have been projected.

3. In a picture projecting machine, a casing having a picture projecting opening therein, a pyramidal shaped light concentrating member arranged in said casing having a sight opening therein, means for projecting light through said sight opening, a projecting lens arranged in front of said member, a rotatable shaft arranged in the casing, a drum slidably mounted on said shaft, and arranged for rotary movement therewith, a motor, a second shaft, means for operating said second shaft by said motor, means for operating said first mentioned shaft step by step by said second mentioned shaft, a picture strip spirally wound upon said drum, means for sliding said drum on said shaft during the rotation of said shaft, whereby the pictures will be successively brought into correct relation with the light concentrating member, and means for automatically sliding the drum to its normal position on said shaft after all of the pictures have been exhibited.

4. In a picture projecting apparatus, a casing having a picture opening therein, a shaft rotatably mounted in said casing, a light concentrating member having a picture opening formed therein arranged in said casing, a drum slidably mounted on said shaft arranged for rotation therewith, a picture strip spirally wound upon said drum, a ring keyed to said shaft, a plurality of equi-distantly spaced pins carried by said ring, a second shaft, a motor for operating said second shaft, a pair of spaced disks keyed to said second mentioned shaft, the disks having diametrically arranged notches formed therein for the reception of said pins, diametrically opposed cam lugs formed on one of said disks arranged to engage the pins to move said shaft step by step, and means actuated by said ring carrying said pins for sliding the drum on the shaft.

5. In a moving picture projecting apparatus, a casing having a picture opening therein, a rotatable shaft arranged in the casing, a drum slidably mounted on said shaft and arranged for rotation therewith, a motor for operating said shaft, a feed screw for sliding the drum on said shaft, and means for reversing the direction of the feed screw to reverse the sliding movement of said drum when all of the pictures have been exhibited.

6. In a moving picture apparatus, a housing having a picture opening therein, a shaft rotatably mounted in said housing, a drum slidably mounted on said shaft and arranged for rotation therewith, a drive shaft, a motor for operating said drive shaft, a ring gear keyed to said first mentioned shaft, a plurality of outwardly extending equi-distantly spaced pins carried by the ring gear, a pair of disks keyed to said operating shaft, the disks having pairs of diametrically opposed notches formed therein, and outwardly extending cam arms formed thereon arranged to engage said pins to transmit a step by step motion to said ring gear, a feed screw, a nut arranged on said feed screw, means formed on said nut arranged to engage the drum to slide the same on the first mentioned shaft, means for operating said feed screw from said ring gear and from said operating shaft, and means operated by said drum for actuating either one of said operating means for operating said feed screw.

7. In a picture projecting machine, a housing having a picture opening therein, a shaft rotatably mounted in said housing, a drum slidably mounted on said shaft and arranged to rotate therewith, means for rotating said shaft step by step, a feed screw, a nut arranged on said feed screw, means operatively connecting said nut with said drum for sliding the same on said first mentioned shaft, a drive shaft, a beveled gear on said drive shaft having a relatively large diameter, a beveled gear rotatably mounted on said feed screw having a relatively small diameter meshing with the first mentioned beveled gear, a second gear rotatably mounted on said feed screw arranged to engage and be operated by said means for operating said first mentioned shaft step by step, a shiftable clutch carried by said feed screw, stationary clutch sections carried by said beveled gear mounted on the feed screw and the second gear mounted on said feed screw, and means for shifting the position of said sliding clutch section when the drum reaches the limit of its sliding movements on said first mentioned shaft.

8. In a moving picture apparatus, a casing having a picture opening therein, a shaft rotatably mounted within said casing, a drum slidably mounted on said shaft arranged for rotation therewith, a spirally wound picture strip arranged on the periphery of said drum, an operating shaft. a motor for operating said shaft, a ring gear keyed to said first mentioned shaft, a plurality of outwardly extending equi-distantly spaced pins carried by said ring gear, a pair of spaced disks keyed to said operating shaft, the disks having outwardly extending diametrically opposite cam arms formed thereon arranged to engage said pins, a feed screw, a nut mounted on said feed screw, a roller carried by said feed screw, the drum having an annular groove arranged to receive said roller, a spur gear wheel rotatably mounted on said feed screw arranged to engage said ring gear, a beveled gear wheel rotatably mounted on said feed screw, a relatively large beveled gear keyed to said drive shaft arranged to engage the first mentioned beveled gear, clutch faces formed on said first mentioned beveled gear and the spur gear, a sliding clutch section mounted on said feed screw, a rockable shaft, a yoke carried by said rockable shaft arranged to engage said shifting clutch section, a sliding rod operatively connected to said rockable shaft, and means carried by said nut arranged to engage said shiftable rod for operating the same when the drum reaches the limit of its sliding movement on said first mentioned shaft.

9. In a moving picture apparatus, a casing having a picture opening therein, a shaft rotatably mounted in said casing, a drum slidably mounted on said shaft and arranged for rotation therewith, a spirally wound picture strip arranged on said drum, a light concentrating member arranged in said casing in front of said drum having a picture opening formed therein, means for concentrating light beams through said opening, a projecting lens arranged in front of said means, a barrel shutter arranged in front of said lens, a drive shaft, a motor for operating said drive shaft, means operatively connecting the barrel shutter with said drive shaft, a ring gear secured to said first mentioned shaft, means for driving the ring gear in a step by step motion from said drive shaft, a feed screw, a nut arranged on said feed screw, means carried by said nut arranged to engage the drum for sliding the same on said first mentioned shaft, a spur gear rotatably mounted upon said feed screw arranged to engage the ring gear, a beveled gear wheel rotatably mounted on said feed screw, a relatively large beveled gear wheel keyed to the drive shaft and meshing with the first mentioned beveled gear, rigid clutch sections carried by said spur gear wheel and the first mentioned beveled gear wheel, a shifting clutch section splined to said feed screw, means for shifting said clutch section when the drum reaches the limit of its sliding movement at either end of said first mentioned shaft.

FRANK E. MOREHOUSE.
CARL O. MANNING.